United States Patent
Wang et al.

(10) Patent No.: US 9,773,414 B2
(45) Date of Patent: Sep. 26, 2017

(54) PARKING MANAGEMENT APPARATUS AND SYSTEM

(71) Applicant: SENGLED OPTOELECTRONICS CO., LTD., Tongxiang (CN)

(72) Inventors: Xia Wang, Tongxiang (CN); Chaoqun Sun, Tongxiang (CN); Jinxiang Shen, Tongxiang (CN)

(73) Assignee: SENGLED OPTOELECTRONICS CO., LTD, Tongxiang (CN)

( * ) Notice: Subject to any disclaimer, the term of this patent is extended or adjusted under 35 U.S.C. 154(b) by 0 days.

(21) Appl. No.: 15/027,025

(22) PCT Filed: Oct. 28, 2015

(86) PCT No.: PCT/CN2015/092999
§ 371 (c)(1),
(2) Date: Apr. 4, 2016

(87) PCT Pub. No.: WO2016/078500
PCT Pub. Date: May 26, 2016

(65) Prior Publication Data
US 2016/0328970 A1   Nov. 10, 2016

(30) Foreign Application Priority Data
Nov. 19, 2014   (CN) .......................... 2014 1 0664563

(51) Int. Cl.
*B60Q 1/48* (2006.01)
*G08G 1/14* (2006.01)
(Continued)

(52) U.S. Cl.
CPC ............ *G08G 1/142* (2013.01); *H04W 4/008* (2013.01); *H04W 84/12* (2013.01)

(58) Field of Classification Search
CPC ....... G08G 1/142; H04W 4/008; H04W 84/12
See application file for complete search history.

(56) References Cited

U.S. PATENT DOCUMENTS 6,771,185 B1 *   8/2004   Yoo .................... G06Q 30/0284
                                                                340/525
7,123,166 B1 *   10/2006   Haynes .................... G08G 1/14
                                                                340/932.2
(Continued)

FOREIGN PATENT DOCUMENTS

CN   102496304 A   6/2012
CN   202352101 U   7/2012
(Continued)

OTHER PUBLICATIONS

The World Intellectual Property Organization (WIPO) International Search Report for PCT/CN2015/092999 dated Jan. 6, 2016.

*Primary Examiner* — Quang D Pham
(74) *Attorney, Agent, or Firm* — Anova Law Group, PLLC

(57) ABSTRACT

A parking management system is provided. The system includes a plurality of first parking management apparatuses configured to detect whether parking spaces are occupied and to adjust a brightness level of lights based on occupancy information of the parking spaces. The system also includes at least one second parking management apparatus configured to detect whether a vehicle passes through one of an entrance and an exit of a parking facility and perform corresponding operations based on a detection result. Further, the system includes a server, where the first parking management apparatuses are cascaded through a first Bluetooth module. The first parking management apparatus is connected to a wireless module of the second parking management apparatus through the first Bluetooth module; the second parking management apparatus communicates with the server through the wireless module; and the plu- (Continued)

rality of first parking management apparatuses communicate with the server through the second parking management apparatus.

14 Claims, 2 Drawing Sheets

(51) Int. Cl.
*H04W 4/00* (2009.01)
*H04W 84/12* (2009.01)

(56) References Cited

U.S. PATENT DOCUMENTS

| | | | | |
|---|---|---|---|---|
| 7,253,747 | B2* | 8/2007 | Noguchi | G08G 1/14 340/932.2 |
| 8,830,088 | B2* | 9/2014 | Hod | G01S 7/52004 340/932.2 |
| 8,841,846 | B2* | 9/2014 | Yoo | H05B 37/02 315/76 |
| 9,035,799 | B2* | 5/2015 | Love | G08G 1/144 340/932.2 |
| 9,286,804 | B2* | 3/2016 | Fayfield | G08G 1/142 |
| 9,299,258 | B1* | 3/2016 | Foster | G08G 1/144 |
| 9,373,108 | B2* | 6/2016 | Sathe | G06Q 20/10 |
| 9,418,553 | B2* | 8/2016 | Nakhjavani | G08G 1/144 |
| 9,594,956 | B2* | 3/2017 | Cohen | G07B 15/02 |
| 9,659,296 | B2* | 5/2017 | Patel | G06Q 20/327 |
| 2004/0039632 | A1* | 2/2004 | Han | G06Q 20/32 705/13 |
| 2004/0252034 | A1* | 12/2004 | Slemmer | G08G 1/14 340/932.2 |
| 2005/0057373 | A1* | 3/2005 | Noguchi | G08G 1/14 340/932.2 |
| 2007/0061192 | A1* | 3/2007 | Chew | G08G 1/14 705/13 |
| 2008/0033769 | A1* | 2/2008 | Koorapati | G06Q 10/02 705/5 |
| 2008/0238715 | A1* | 10/2008 | Cheng | G07F 11/002 340/870.02 |
| 2008/0266138 | A1* | 10/2008 | Ponert | G08G 1/04 340/932.2 |
| 2010/0309024 | A1* | 12/2010 | Mimeault | G08G 1/04 340/932.2 |
| 2012/0092190 | A1* | 4/2012 | Stefik | G06Q 10/02 340/932.2 |
| 2012/0235579 | A1* | 9/2012 | Chemel | F21S 2/005 315/152 |
| 2013/0113936 | A1* | 5/2013 | Cohen | G07B 15/02 348/148 |
| 2013/0320864 | A1* | 12/2013 | Yoo | H05B 37/02 315/154 |
| 2014/0169134 | A1* | 6/2014 | Hod | G01S 7/52004 367/93 |
| 2015/0130642 | A1* | 5/2015 | Huang | B62D 15/028 340/932.2 |
| 2016/0020861 | A1* | 1/2016 | Jin | H04B 17/11 455/456.1 |
| 2016/0021169 | A1* | 1/2016 | Chan | H04L 67/04 709/217 |
| 2016/0049077 | A1* | 2/2016 | Sandbrook | G08G 1/146 340/932.2 |
| 2016/0110998 | A1* | 4/2016 | Todasco | G08G 1/07 340/944 |
| 2016/0133134 | A1* | 5/2016 | Todasco | G07B 15/02 705/13 |
| 2016/0189324 | A1* | 6/2016 | Eramian | G06Q 50/30 705/13 |
| 2016/0241458 | A1* | 8/2016 | Fontaine | H04L 12/40169 |
| 2016/0379495 | A1* | 12/2016 | Engelen | G08G 1/005 340/932.2 |
| 2016/0381492 | A1* | 12/2016 | Terazaki | H04L 67/42 455/41.2 |
| 2017/0006112 | A1* | 1/2017 | Tomida | H04L 67/10 |

FOREIGN PATENT DOCUMENTS

| | | |
|---|---|---|
| CN | 103714716 A | 4/2014 |
| CN | 104376740 A | 2/2015 |
| CN | 204288529 U | 4/2015 |
| JP | 2009175962 A | 8/2009 |

* cited by examiner

PARKING MANAGEMENT APPARATUS AND SYSTEM

CROSS-REFERENCES TO RELATED APPLICATIONS

This application is a national stage application under 35 USC §371(c) of PCT Application No. PCT/CN2015/092999, entitled "Parking Management Apparatus And System," filed on Oct. 28, 2015, which claims priority to Chinese Patent Application No. 201410664563.0, filed on Nov. 19, 2014. The entire disclosure and contents of the above applications are hereby incorporated by reference herein.

FIELD OF THE INVENTION

The present disclosure generally relates to the intelligent control technology field and, more particularly, relates to a parking management apparatus and system.

BACKGROUND

Currently, management technologies of many parking facilities are poor. There are few intelligent parking management systems. On one hand, status of parking spaces is often not well monitored and utilization rate of the parking spaces may be low. Because the space of a parking facility is very big, it may be difficult for a driver to look for a parking space or look for a parked vehicle, thus wasting time and energy. On the other hand, the lighting of the parking facility may be dark, and the driver's line of sight may be impaired. Therefore, the driving safety in a parking facility may not be ensured. Or, the lighting of the parking facility may stay bright all the time, thus, wasting the energy. Moreover, if many vehicles exit the parking facility within a same time period, due to low efficiency of a manual toll collection system, there may have a long wait in line for paying parking fees.

The disclosed parking management systems and apparatuses are directed to solve one or more problems set forth above and other problems.

BRIEF SUMMARY OF THE DISCLOSURE

One aspect of the present disclosure includes a parking management system. The system includes a plurality of first parking management apparatuses configured to detect whether parking spaces are occupied and adjust brightness level of lights based on occupancy information of the parking spaces. The system also includes at least one second parking management apparatus configured to detect whether a vehicle passes through one of an entrance and an exit of a parking facility and perform corresponding operations based on a detection result. Further, the system includes a server, where the first parking management apparatuses are cascaded through a first Bluetooth module; the first parking management apparatus is connected to a wireless module of the second parking management apparatus through the first Bluetooth module; the second parking management apparatus communicates with the server through the wireless module; and the plurality of first parking management apparatuses communicate with the server through the second parking management apparatus.

Another aspect of the present disclosure includes a parking management method. The method includes detecting whether a parking space is occupied. The method also includes sending occupancy information of the parking space to a server via a first Bluetooth module, where the occupancy information shows that the parking space is one of occupied and free. Further, the method includes intelligently adjusting brightness level of light based on the occupancy information of the parking space.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
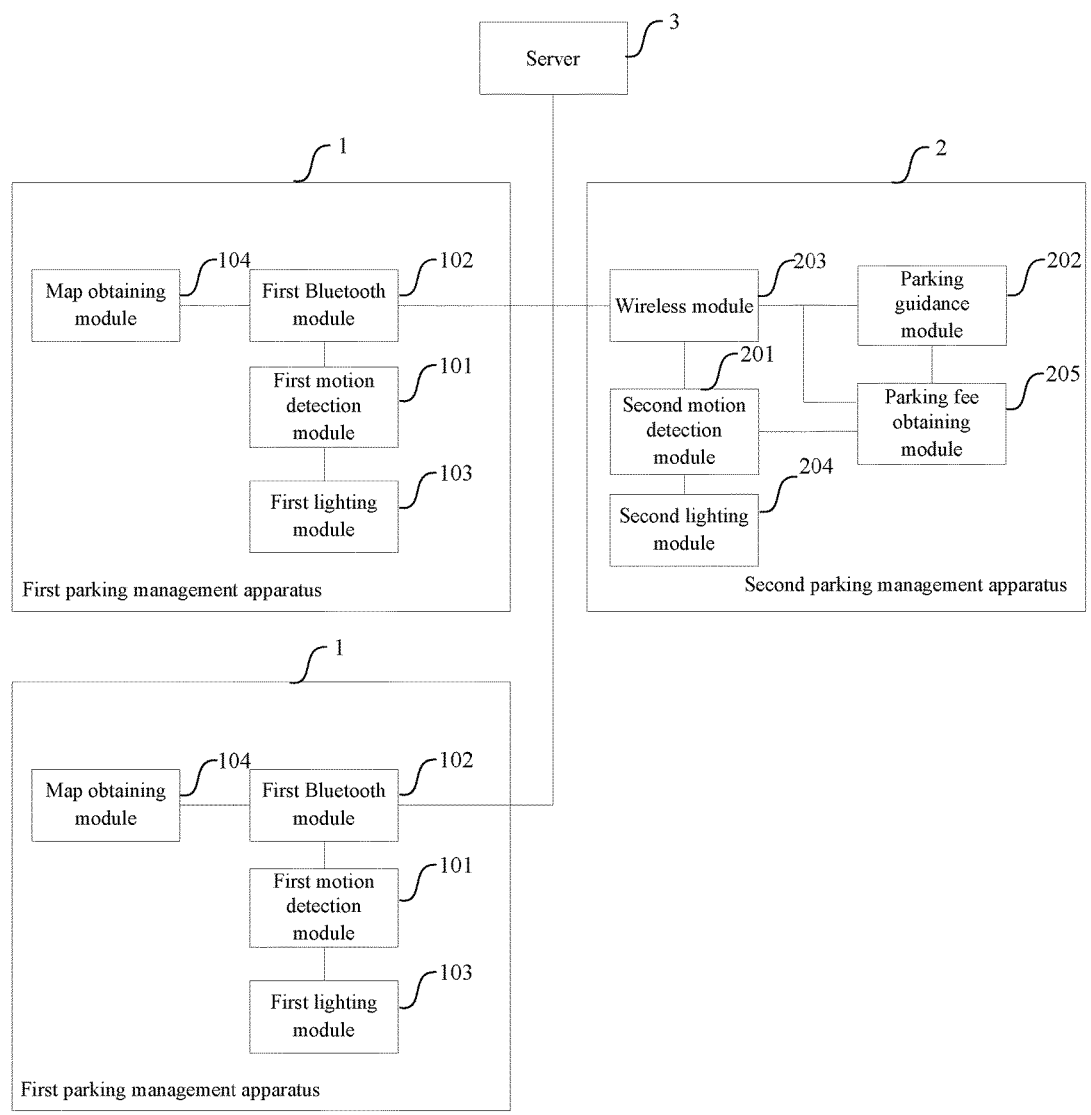
FIG. 1 illustrates a schematic diagram of an exemplary parking management system consistent with the disclosed embodiments.

FIG. 1 illustrates a schematic diagram of an exemplary parking management system consistent with the disclosed embodiments. As shown in FIG. 1, the parking management system may include a plurality of first parking management apparatuses 1, at least one second parking management apparatus 2, and a server 3. The plurality of first parking management apparatuses are installed on parking spaces (e.g., on the top of the parking spaces). The second parking management apparatus is installed at an entrance (e.g., on the top of an entrance) of a parking facility. There are two first parking management apparatuses 1 and one second parking management apparatus 2 in FIG. 1. Certain devices may be omitted and other devices may be included.

The plurality of first parking management apparatuses are cascaded through, for example, a Bluetooth low energy (BLE) 4.1 module. The first parking management apparatus and the second parking management apparatus are also cascaded through the BLE 4.1 module. The second parking management apparatus and the server are connected through the BLE 4.1 module or a Wireless Fidelity (Wi-Fi) module.

The first parking management apparatuses communicate with the server directly or indirectly through the second parking management apparatus.

Specifically, the first parking management apparatus 1 may include a first motion detection module 101, a first Bluetooth module 102 and a first lighting module 103.

The first motion detection module 101 may be configured to detect whether a parking space is occupied and send occupancy information of the parking space to the first Bluetooth module 102 and the first lighting module 103.

The first Bluetooth module 102 may be configured to send the occupancy information of the parking space to the server 3. Therefore, the server 3 can obtain occupancy information of each parking space, improving the utilization of free parking spaces. Optionally, the first Bluetooth module is a BLE 4.1 module.

The first lighting module 103 may be configured to adjust the brightness level of lights based on the received occupancy information of the parking space.

Specifically, the first lighting module 103 may include a first information receiving submodule (not shown in FIG. 1), a first light adjusting submodule (not shown in FIG. 1), and a first lighting assembly (not shown in FIG. 1).

The first information receiving submodule may be configured to receive the occupancy information of the parking space.

The first light adjusting submodule may be configured to, based on the occupancy information of the parking space, adjust the brightness level of the first lighting assembly. For example, when the occupancy information of the parking space shows that the parking space is free, the brightness level of the first lighting assembly is maintained at a first predetermined brightness level. When the occupancy information of the parking space shows that the parking space is occupied, the brightness level of the first lighting assembly is increased to a second predetermined brightness level and is maintained at the second predetermined brightness level for a preset time period. The brightness level of the first lighting assembly is decreased to the first predetermined brightness level when time exceeds the preset time period.

The first lighting assembly may be configured to provide lighting with the first predetermined brightness level when the parking space is free. The first lighting assembly may also be configured to provide lighting with the second predetermined brightness level for the preset time period when the parking space is occupied, and provide the lighting with the first predetermined brightness level when the time exceeds the preset time period, where the first predetermined brightness level is lower than the second predetermined brightness level.

In this way, the first lighting assembly provides the lighting with the second predetermined brightness level during the preset time period. Thus, driving safety may be improved and it is more convenient for a driver to take things out from his/her vehicle when parking. When the parking space is free or the time exceeds the preset time period, the first lighting assembly provides the lighting with the first predetermined brightness level, thus saving the energy.

Optionally, the first parking management apparatus 1 may also include a map obtaining module 104. The map obtaining module 104 may be configured to obtain a map of the parking facility from the server 3 through the first Bluetooth module 102, and mark the position of a parking space in the map of the parking facility.

Accordingly, the first Bluetooth module 102 may also be configured to send the map with the marked parking space to a user device held by a driver whose vehicle occupies the parking space when the parking space is occupied. In this case, the driver may quickly find the parking space at which his/her vehicle parked when the driver wants to leave the parking facility. The user device may be a device with Bluetooth or other wireless functions, such as a smartphone, a computer, a tablet computer, etc.

The second parking management apparatus 2 may include a second motion detection module 201, a parking guidance module 202, a wireless module 203, and a second lighting module 204.

The second motion detection module 201 may be configured to detect whether a vehicle enters into the entrance of the parking facility, and inform the wireless module 203 and the second lighting module 204 when it is detected that a vehicle enters into the entrance of the parking facility.

The parking guidance module 202 may be configured to obtain the map of the parking facility from the server 3 through the wireless module 203. Occupancy information of each parking space is marked in the map, where the occupancy information shows that the parking space is occupied or free.

The wireless module 203 may be configured to, when it is detected that a vehicle enters into the entrance of the parking facility, send the map including occupancy information of each parking space of the parking facility to the user device held by the driver. In this way, the driver may quickly find a free parking space based on the map of the parking facility. Optionally, the wireless module may be a BLE 4.1 module, or include the BLE 4.1 module and a Wi-Fi module. The user device held by the driver is a user device with a Bluetooth function or a Wi-Fi function.

The second lighting module 204 may be configured to, when a vehicle enters into or exits the parking facility, adjust the brightness level of light. Specifically, the second lighting module 204 may include a second information receiving submodule (not shown in FIG. 1), a second light adjusting submodule (not shown in FIG. 1), and a second lighting assembly (not shown in FIG. 1).

The second information receiving submodule may be configured to receive vehicle entry/exit information at the entrance and exit of the parking facility.

The second light adjusting submodule may be configured to maintain the brightness level of the second lighting assembly at a first predetermined brightness level when no vehicle enters into the entrance of the parking facility or exits the exit of the parking facility. The second light adjusting submodule may also be configured to adjust the brightness level of the second lighting assembly to a second predetermined brightness level when a vehicle enters into the entrance of the parking facility or exits the exit of the parking facility, and maintain the second predetermined brightness for a preset time period. The brightness level of the second lighting assembly is decreased to the first predetermined brightness level when the time exceeds the preset time period.

The second lighting assembly may be configured to provide the first predetermined brightness level when no vehicle enters into or exits the parking facility. The second lighting assembly may also be configured to provide the second predetermined brightness level for a preset time period when a vehicle enters into or exits the parking facility. The brightness level of the second lighting assembly is decreased to the first predetermined brightness level when the time exceeds the preset time period, where the first predetermined brightness is lower than the second predetermined brightness level. Thus, driving safety is improved and the energy is saved.

Optionally, the second parking management apparatus 2 may further include a parking fee obtaining module 205.

The second motion detection module 201 may also be configured to detect whether a vehicle exits the parking facility, and inform the parking fee obtaining module 205 when it is detected that a vehicle is exiting the parking facility.

The parking fee obtaining module 205 may be configured to obtain the parking fee of the vehicle from the server 3 through the wireless module 203, and send the parking fee of the vehicle to the user device held by the driver who drives the vehicle through the wireless module 203. The parking fee may be calculated via server 3 based on an hourly parking rate and parking hours.

The driver who drives the vehicle may pay the parking fee via a mobile online payment platform in the user device held by the driver. After the parking fee is paid successfully, the user device held by the driver sends payment successful information to the wireless module 203 through the wireless technology. The wireless module 203 may also be configured to receive the payment successful information from the user device held by the driver who drives the vehicle. In some embodiments, the user may have paid the parking fee before he drove to the exit. The wireless module 203 may also read a payment receipt and send the payment successful information from the user device held by the driver.

By using the parking management system, when many vehicles exit the parking facility in a same time period, a long waiting line for paying the parking fee caused by low efficiency of the manual toll collection system may be avoided.

Figure 2:
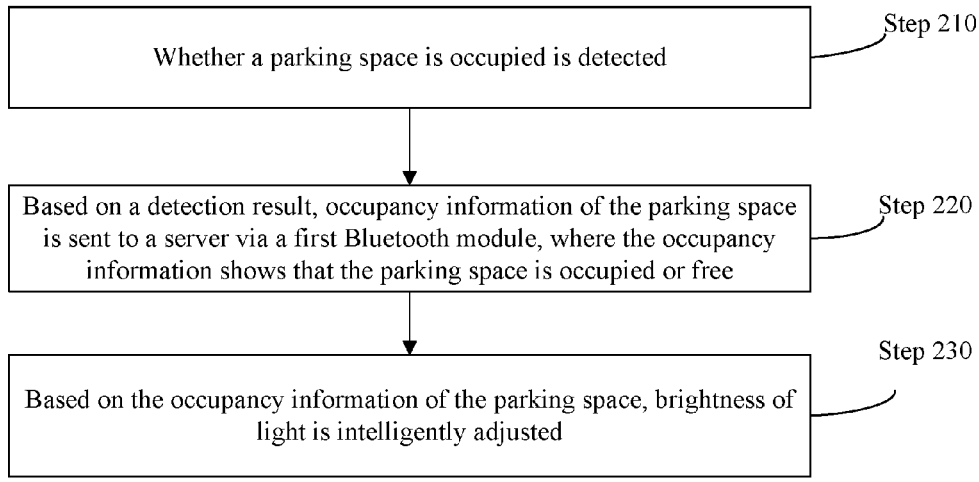
FIG. 2 illustrates a flow chart of an exemplary parking management process consistent with the disclosed embodiments.

FIG. 2 illustrates a flow chart of an exemplary parking management process consistent with the disclosed embodiments. As shown in FIG. 2, the process may include the following steps.

Step 210: the parking management system detects whether a parking space is occupied.

Step 220: based on a detection result, occupancy information of the parking space is sent to a server via a first Bluetooth module, where the occupancy information shows that the parking space is occupied or free.

Thus, status of the parking space is obtained, improving the utilization of the free parking spaces.

Step 230: based on the occupancy information of the parking space, the parking management system adjusts the brightness level of light intelligently.

Specifically, when the occupancy information of the parking space shows that the parking space is free, the brightness level of light is maintained at a first predetermined brightness level. When the occupancy information of the parking space shows that the parking space is occupied, the brightness level of light is increased to a second predetermined brightness and is maintained at the second predetermined brightness level for a preset time period. The brightness level of light is decreased to the first predetermined brightness level when time exceeds the preset time period, where the first predetermined brightness level is lower than the second predetermined brightness level.

Figure 3:
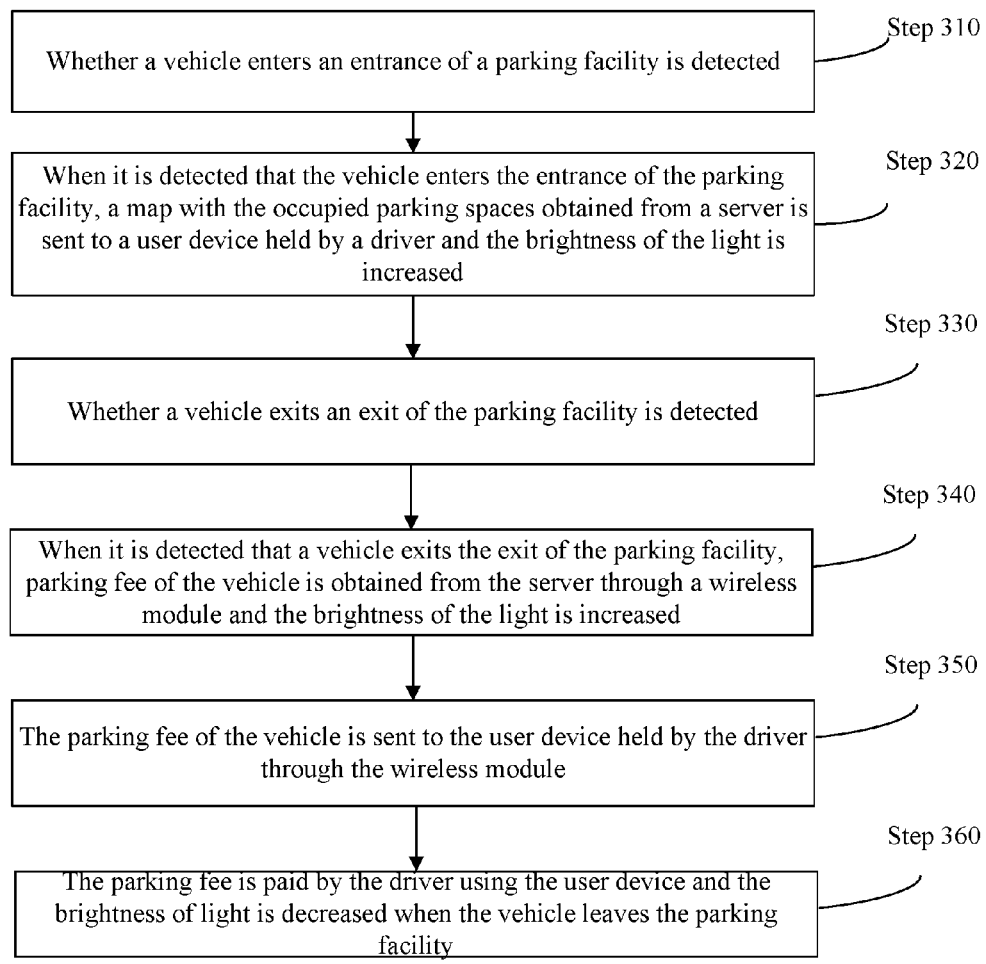
FIG. 3 illustrates a flow chart of another exemplary parking management process consistent with the disclosed embodiments.

FIG. 3 illustrates a flow chart of another exemplary parking management process consistent with the disclosed embodiments. As shown in FIG. 3, the process may include the following steps.

Step 310: the parking management system detects whether a vehicle enters an entrance of a parking facility.

Step 320: when it is detected that the vehicle enters the entrance of the parking facility, a map with the occupied parking spaces obtained from a server is sent to a user device held by a driver and the brightness level of light is increased.

Occupancy information of each parking space is marked in the map, where the occupancy information shows that the parking space is occupied or free. When it is detected that a vehicle enters into the entrance of the parking facility, the map including occupancy information of each parking space of the parking facility is sent to the user device held by the driver. In this way, the driver may quickly find a free parking space based on the map of the parking facility.

Step 330: the parking management system detects whether a vehicle exits an exit of the parking facility.

Step 340: when it is detected that a vehicle is exiting the exit of the parking facility, parking fee of the vehicle is obtained from the server through a wireless module and the brightness level of light is increased.

Step 350: the parking fee of the vehicle is sent to the user device held by the driver through the wireless module.

Step 360: the parking fee is paid by the driver using the user device and the brightness level of light is decreased when the vehicle leaves the parking facility.

The steps of a method or algorithm described in connection with the embodiments disclosed herein may be embodied directly in hardware, in a software module executed by a processor, or in a combination of the two. For example, various modules of this disclosure may be implemented through Application Specific Integrated Circuit (ASIC) or any other similar hardware devices. The software programs (including related data structures) consistent with this disclosure may be stored in readable recording medium, such as RAM memory, flash memory, ROM memory, EPROM memory, EEPROM memory, registers, hard disk, a removable disk, a CD-ROM, or any other form of storage medium known in the art. The processor and the storage medium may reside in an ASIC.

Although this disclosure may be expanded using various forms of modifications and alternations, the specification also lists a number of specific embodiments to explain in detail. It should be understood that the purpose of the inventor is not to limit the disclosure to the specific embodiments described herein. On the contrary, the purpose of the inventor is to protect all the improvements, equivalent conversions and modifications based on spirit or scope defined by the claims in the disclosure. The same reference numbers may be used throughout the drawings to refer to the same or like parts. In addition, the term "include" does not exclude other modules or steps. Words importing the singular only also include the plural. Various modules or devices disclosed in this disclosure may be implemented by one module or device through software or hardware. Words, such as "the first", "the second" are used to represent names only without indicating any particular order.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Comparing with the existing technology, the first motion detection module of the first parking management apparatus installed on a parking space detects whether the parking space is occupied and then sends occupancy information of the parking space to the server via the first Bluetooth module. Therefore, the status of the parking space is obtained, which may improve the utilization of the free parking spaces. The first lighting module may intelligently adjust the brightness level of light based on the received occupancy information of the parking space. Thus, the driving safety is ensured and the energy is saved.

In some embodiments consistent with the present disclosure, the first lighting module may include one or more LED lighting assemblies. The first lighting module may provide an indicator light as well as general lighting for the area of the parking space. For example, when the motion detection module of the first parking management apparatus detects that the parking space is open or occupied, the first light adjusting submodule may turn on/off or change the color of the indicator light provided by the first lighting module to indicate whether the parking space is occupied (e.g., green light may indicate the space is not occupied; red light may indicate that space is occupied). At the same time, the first light adjusting module may also change the general lighting of the parking space area by adjusting the brightness level of the light as described above. That is, the indicator light and the general lighting can both be controlled according to the status of the parking space by the first parking management apparatus.

Similarly, the parking fee obtaining module 205 of the second parking management apparatus may be used in combination with the second lighting module to indicate the status of the parking fee payment. The second lighting module may provide both an indicator light and general lighting using one or more lighting assemblies (e.g., LED lights). For example, when a user has successfully made parking fee payment, the second light adjusting module may turn on or change the color of the indicator light to indicate the completion of the parking fee payment process and increase the brightness level of the general lighting of the exit area to facilitate the exiting of the vehicle at the same time.

In some embodiments consistent with the present disclosure, server 3 may collect and store data related to the parking facility, such as the data related to how often a certain entrance or exit is used or how often certain parking spaces are occupied. Server 3 may present such data on a map of the parking facility. For example, server 3 may create a map of the parking facility showing the utilization rate (e.g., frequency of use over a set time) of the parking spaces, entrances, and exits.

In some embodiments, the second parking management apparatus may include a control module for other amenities, such as the elevators, in the parking facility. Server 3 may provide data reflecting the activities in the parking facility related to entering, exiting, and parking, to the second parking management apparatus. The second parking management apparatus may use another control module to control other devices, such as the elevators in the parking facility, based on the entering, exiting, and parking data. For example, when a number of users parked at one level (e.g., level 3) of the parking facility, the second parking management apparatus may call the elevators to that level (e.g., level 3) of the parking facility. In this example, the second parking management apparatus may also include a third lighting module, which may control the lighting in front of the elevators. When the second parking management apparatus calls an elevator to one level of the parking facility, the second parking management apparatus may also use a third light adjusting module to turn on or increase the brightness level of the third lighting module, which include the lights in front of the elevator on that level.

The second motion detection module of the second parking management apparatus installed on the entrance of the parking facility detects whether a vehicle enters into the entrance of the parking facility, and then sends the parking facility map with the occupied parking spaces obtained from the server to a user device held by a driver. In this case, the driver may quickly find a free parking space. When the second motion detection module detects that a vehicle enters into the entrance of the parking facility, the brightness level of light is increased, ensuring the driving safety and saving the energy.

In some embodiments of the present disclosure, server 3 may indicate how busy each exit of the parking facility is on the map provided to a user. If a certain exit area has more than a pre-set number of vehicles waiting to exit, server 3 may receive the vehicle exiting data from the second parking management apparatus. Server 3 may indicate on the map that this exit is "busy" by highlighting or coloring the exit on the map. Other users (drivers) may receive this map through the first parking management apparatuses corresponding to their parking spaces and determine to use another exit based on the indication on the map.

What is claimed is:

1. A parking facility management system of a parking facility, comprising:
   a plurality of first parking management apparatuses, each comprising a first motion detection module, a first Bluetooth module, and a first lighting module and being installed above a corresponding parking space of the parking facility, the first motion detection module configured to detect whether the corresponding parking space is occupied or unoccupied, to provide occupancy information of the corresponding parking space to the Bluetooth module and the first lighting module; wherein the first Bluetooth module is configured to send the occupancy information of the corresponding parking space received by the first motion detection module to a server via at least one second parking management apparatus; and wherein the first lighting module is configured to adjust a brightness level of lights based on the occupancy information of the corresponding parking space, and wherein the first lighting module adjusts the brightness level of lights at a first predetermined brightness level when the corresponding parking space is unoccupied and the first lighting module adjusts the brightness level of lights at a second predetermined brightness level when the corresponding parking space is occupied, and wherein the first predetermined brightness level is smaller than the second predetermined brightness level;
   the at least one second parking management apparatus, located at least one of an entrance or an exit of the parking comprising a second motion detection module configured to detect whether a vehicle is entering into the entrance of the parking facility or exiting the exit of the parking facility and perform at least light-brightness adjusting operation and parking fee requesting and confirming operations based on a detection result; and
   the server, wherein:
   the plurality of first parking management apparatuses are cascaded through a first Bluetooth module;
   each of the plurality of first parking management apparatuses is connected to a wireless module of the at least one second parking management apparatus through the corresponding first Bluetooth module;
   the at least one second parking management apparatus communicates with the server through the wireless module;
   each of the plurality first parking management apparatuses communicates with the server directly through the at least one second parking management apparatus; and
   each of the plurality first parking management apparatuses further comprising a map obtaining module configured to obtain a map of the parking facility from the server through the first Bluetooth module and mark its corresponding parking space in the map of the facility.

2. The system according to claim 1, wherein the first lighting module further includes:

a first information receiving submodule configured to receive the occupancy information of the corresponding parking space;
a first lighting assembly;
a first light adjusting submodule configured to, based on the occupancy information of the corresponding parking space, adjust the brightness level of the first lighting assembly, wherein:
if the occupancy information of the corresponding parking space shows that the corresponding parking space is unoccupied, the brightness level of the first lighting assembly is maintained at the first predetermined brightness level;
if the occupancy information of the corresponding parking space shows that the corresponding parking space is occupied, the brightness level of the first lighting assembly is increased to the second predetermined brightness level and is maintained at the second predetermined brightness level for a preset time period; and
if time exceeds the preset time period, the brightness level of the first fighting assembly is decreased to the first predetermined brightness level.

3. The system according to claim 1, wherein:
the first Bluetooth module of the corresponding parking space is further configured to, if the parking space is occupied, send the map of the parking facility with the marked parking space to a user device.

4. The system according to claim 3, wherein:
the first Bluetooth module is a Bluetooth low energy (BLE) 4.1 module.

5. The system according to claim 1 wherein the at least one second parking management apparatus further includes:
the second motion detection module configured to detect whether a vehicle is entering into the entrance of the parking facility, and inform the wireless module and a second lighting module if the second module detection module detects that a vehicle is entering into the entrance of the parking facility;
a parking guidance module configured to obtain the map of the parking facility from the server through the wireless module, wherein the occupancy information of each parking space is marked on the map, and the occupancy information of each parking space is one of occupied and unoccupied;
the wireless module configured to, if the vehicle enters into the entrance of the parking facility, send the map including the occupancy information of each parking space of the parking facility to a user device associated with the vehicle; and
the second lighting module configured to, if the vehicle passes through the entrance or the exit of the parking facility, adjust a brightness level of light to at least one of a first predetermined brightness level and a second predetermined brightness level, wherein the first predetermined brightness level of no vehicle passing through the entrance or the exit of the parking facility is smaller than the second predetermined brightness level of the vehicle passing through the entrance or the exit of the parking facility.

6. The system according to claim 5, wherein;
the at least one second parking management apparatus further includes a parking fee obtaining module;
the second motion detection module is also configured to detect whether a vehicle is exiting the parking facility, and inform the parking fee obtaining module if the second motion detection module detects that the vehicle is exiting the parking facility; and
the parking fee obtaining module is configured to obtain the parking fee of the vehicle from the server through the wireless module, and send a request for the parking fee of the vehicle to the user device associated with the vehicle though the wireless module.

7. The system according to claim 6, wherein:
the wireless module is also configured to receive payment successful information from the user device associated with the vehicle, wherein the payment successful information is information sent by a mobile online payment platform connected to the user device associated with the vehicle after the payment is successfully made.

8. The system according to claim 7, wherein: the first Bluetooth module of each of the plurality first parking management apparatus is a Bluetooth low energy (BLE) 4.1 module.

9. The system according to claim 7, wherein:
the first Bluetooth module includes a Bluetooth low energy (BLE) 4.1 module and a Wireless Fidelity (Wi-Fi) module.

10. The system according to claim 5, wherein the second lighting module further includes:
a second information receiving submodule configured to receive vehicle-entry and exit information at the entrance or exit of the parking facility;
a second light adjusting submodule configured to maintain the brightness level of a second lighting assembly at the first predetermined brightness level if no vehicle enters into the entrance of the parking facility or exits the exit of the parking facility;
the second light adjusting submodule also configured to adjust the brightness level of the second lighting assembly to the second predetermined brightness level if the vehicle passes through one of the entrance and the exit of the parking facility and maintain the second predetermined brightness level for a preset time period, wherein the brightness level of the second lighting assembly is decreased to the first predetermined brightness level if time exceeds the preset time period; and
the second lighting assembly configured to provide the first predetermined brightness level if no vehicle passes through one of the entrance and the exit of the parking facility, and provide the second predetermined brightness level for the preset time period if the vehicle passes through one of the entrance and the exit of the parking facility, wherein the brightness level of the second lighting assembly is decreased to the first predetermined brightness level if time exceeds the preset time period, and the first predetermined brightness level is lower than the second predetermined brightness level.

11. A parking facility management method of a parking facility comprising a plurality of first parking management apparatus, at least one second parking management apparatus, and a server, comprising:
detecting, by each of the plurality of first parking management apparatus, whether a corresponding parking space is occupied; wherein each of the plurality of parking management lighting module and being installed above the corresponding parking space of the parking facility, the first motion detection module configured to detect whether the corresponding parking space is occupied or unoccupied, to provide occupancy information of the corresponding parking space to the first Bluetooth module and the first lighting module;

wherein the first Bluetooth module is configured to send the occupancy information of the corresponding parking space received by the first motion detection module to the server via the at least one second parking management apparatus, and wherein the first lighting module is configured to adjust a brightness level of lights based on the occupancy information of the corresponding parking space, and wherein the first lighting module adjust the brightness level of lights at a first predetermined brightness level when the corresponding parking space is unoccupied and the first lighting module adjusts the brightness level of lights at a second predetermined brightness level when the corresponding parking space is occupied, and wherein the first predetermined brightness level is smaller than the second predetermined brightness level:

sending, by the first Bluetooth module of each of the plurality of first parking management apparatus, the occupancy information of the corresponding parking space received by the first motion detection module to the server via the at least one second parking management apparatus;

based on the occupancy information of the corresponding parking space, adjusting, by the first lghting module, a brightness level of lights over the corresponding parking space: wherein the first lighting module adjusts the brightness level of light at a first predetermined brightness level when the corresponding parking space is unoccupied and the first lighting module adjusts the brightness level of light at a second predetermined brightness level when the corresponding parking space is occupied, and wherein the first predetermined brightness level is smaller than the second predetermined brightness level; and detecting, by a second motion detection module of the at least one second parking management apparatus, located at least one of an entrance or an exit of the parking facility, whether a vehicle is passing through one of the entrance and the exit of a parking facility to perform at least light-brightness adjusting operation and parking fee requesting and confirming operations based on a detection result;

wherein:

the plurality of first parking management apparatuses are cascaded through the first Bluetooth module;

each of the plurality of first parking management apparatuses is connected to a wireless module of the at least one second parking management apparatus through the corresponding first Bluetooth module;

the at least one second parking management apparatus communicates with the server through the wireless module;

each of the plurality first parking management apparatuses communicates with the server directly through the at least one second parking management apparatus; and each of the plurality first parking management apparatuses further comprising a map obtaining module configured to obtain a map of the parking facility from the server through the first Bluetooth module and mark its corresponding parking space in the map of the facility.

12. The method according to claim 11, further including:

if the occupancy information of the corresponding parking space shows that the parking space is unoccupied, maintaining the brightness level of light at the first predetermined brightness level;

if the occupancy information of the corresponding parking space shows that the parking space is occupied, increasing the brightness level of light to the second predetermined brightness level and maintaining the brightness level of light at the second predetermined brightness level for a preset time period; and if time exceeds the preset time period, decreasing the brightness level of light from the predetermined brightness level to the first predetermined brightness level.

13. The method according to claim 11, further including:

if the at least one second parking management apparatus detects that the vehicle is entering the entrance of the parking facility, sending a map obtained from server with occupied parking spaces to a user device associated with the vehicle and increasing the brightness level of light at the entrance.

14. The method according to claim 13, further including:

if the at least one second parking management apparatus detects that a vehicle is exiting the exit of the parking facility, obtaining a parking fee of the vehicle from the server through a wireless module and increasing the brightness level of light from the first predetermined brightness level to the second predetermined brightness level at the exit;

sending a parking fee request to the user device associated with the vehicle through the wireless module; and receiving a parking fee payment notice and decreasing the brightness level of light from the second predetermined brightness level to the first predetermined brightness level, if the vehicle leaves the parking facility.

* * * * *